(12) United States Patent
Eberle et al.

(10) Patent No.: US 7,025,523 B2
(45) Date of Patent: Apr. 11, 2006

(54) DEVICE FOR FASTENING A CORDLESS COMMUNICATION DEVICE

(75) Inventors: Erwin Eberle, München (DE); Joachim Herzer, München (DE)

(73) Assignee: Siemens Aktiengesellschaft, Munich (DE)

( * ) Notice: Subject to any disclaimer, the term of this patent is extended or adjusted under 35 U.S.C. 154(b) by 33 days.

(21) Appl. No.: 10/381,141

(22) PCT Filed: Sep. 7, 2001

(86) PCT No.: PCT/DE01/03461

§ 371 (c)(1),
(2), (4) Date: Mar. 21, 2003

(87) PCT Pub. No.: WO02/25905

PCT Pub. Date: Mar. 28, 2002

(65) Prior Publication Data

US 2003/0198508 A1     Oct. 23, 2003

(30) Foreign Application Priority Data

Sep. 22, 2000    (DE) ................................ 100 47 132

(51) Int. Cl.
*B25G 3/24* (2006.01)
(52) U.S. Cl. ..................................... 403/289
(58) Field of Classification Search ................ 403/289, 403/326
See application file for complete search history.

(56) References Cited

U.S. PATENT DOCUMENTS

| 5,087,004 | A |   | 2/1992  | Lundell et al. |
| 5,143,500 | A | * | 9/1992  | Schuring et al. ............ 403/289 |
| 5,807,012 | A |   | 9/1998  | Emmert et al. |
| 5,816,733 | A | * | 10/1998 | Ishikawa et al. ............ 403/329 |
| 5,853,261 | A | * | 12/1998 | Keruzore .................... 403/350 |

FOREIGN PATENT DOCUMENTS

DE           296 01 412 U1     5/1996

* cited by examiner

*Primary Examiner*—John R. Cottingham
(74) *Attorney, Agent, or Firm*—Staas & Halsey LLP

(57) ABSTRACT

A cordless communication device is fastened to a wall surface by a supporting element having a central tubular plug element, which points with its axial direction toward the wall surface, and which is provided for plugging-in and retaining a mating plug element that is joined to the bottom of the device housing. The plug element is configured such that it positively engages, at least in partial areas, with the mating plug element extending over or into the plug element. Axially extending guide elements, which maintain a selected rotational angle position between the plug element and the mating plug element, are arranged on the plug element or on the mating plug element. The supporting element is provided for fastening to a flush mounting box provided with continuous openings for fastening screws of the flush mounting box.

11 Claims, 3 Drawing Sheets

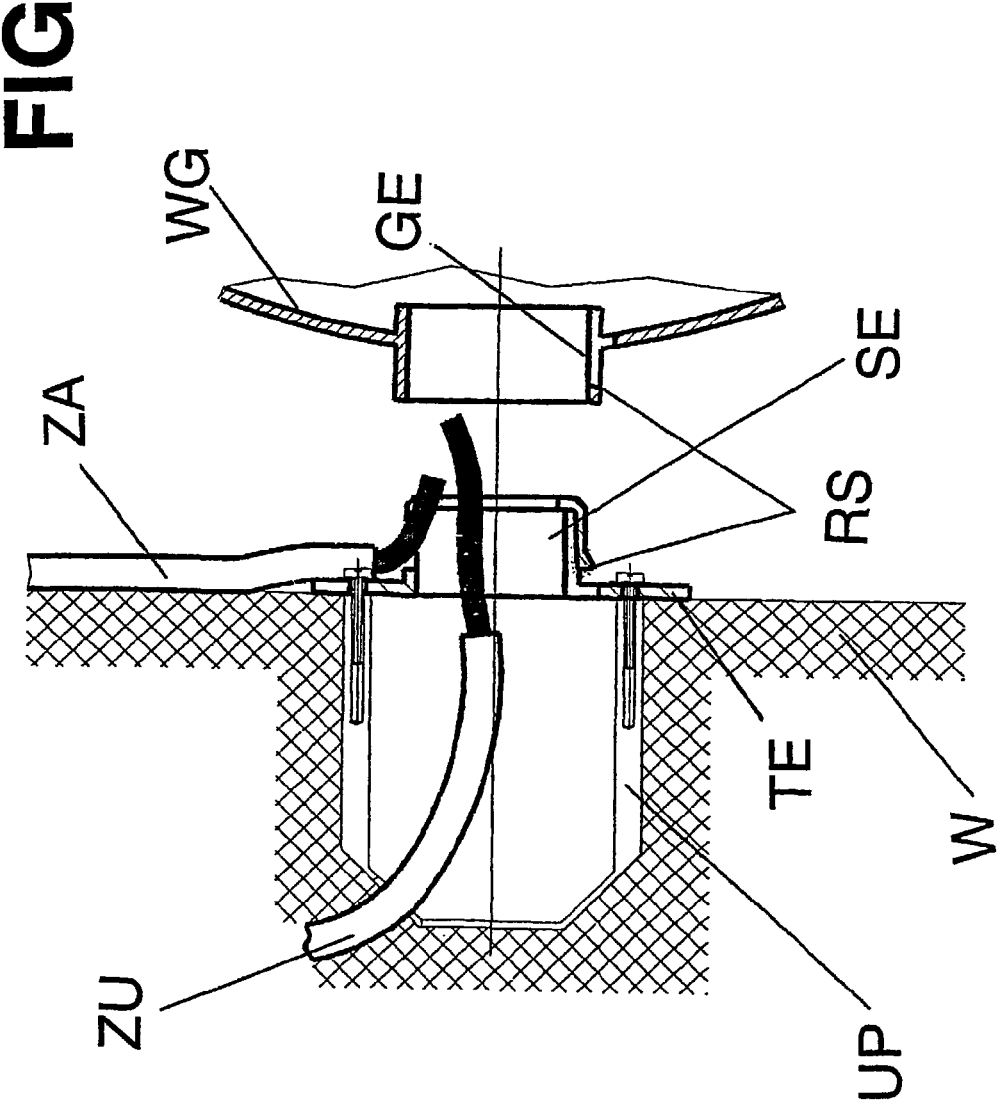

DEVICE FOR FASTENING A CORDLESS COMMUNICATION DEVICE

CROSS REFERENCE TO RELATED APPLICATIONS

This application is based on and hereby claims priority to German Application No. 10047132.3 filed on Sep. 22, 2000, the contents of which are hereby incorporated by reference.

BACKGROUND OF THE INVENTION

Cordless communication devices, e.g. DECT base stations, require a plurality of signal-carrying and power-supply lines to be connected. Such devices are therefore not usually mounted on a wall until the wiring work has been completed. In order to obtain simpler access to the connection points of the lines for maintenance purposes, these devices are often fastened to a wall so as to be easily removable. Many housings of such devices have depressions or clips on the back for this purpose for insertion in premounted supporting elements. In the simplest case such supporting elements are screws which are screwed into the wall and have a projection.

In order to route surface-mounted lines in a more orderly fashion to connections on the device housing, supporting elements in the form of mounting rails are also common, which once they have been mounted on the wall also enable the housing to be inserted and in addition fix in position surface-mounted lines routed to the device.

Cordless communication devices have a special feature, namely an antenna, which has a specific emission characteristic and preferred direction of the wave vector. After mounting such devices it is often apparent that it would be desirable for the device to be rotated on the wall, since a different angular position of the antenna to the perpendicular results in an improvement to the quality of reception and transmission.

This adjustment of the position of the device is expensive and time-consuming with the mounting arrangements described, since the only way to correct the rotational angle on the wall is by remounting the supporting elements in question.

SUMMARY OF THE INVENTION

An object of the invention is to specify a device for fastening a cordless communication device, which once the supporting element is mounted enables a device housing to be held at a plurality of selectable rotational angles in the plane of the wall.

In the device according to the invention a supporting element is provided for wall mounting which has a central tubular plug element, on which the housing—thanks to a mating plug element on the back of the housing which positively engages with the plug element—can be plugged into the wall in a plurality of selectable angular positions. Adjusting the angular position in order to improve the quality of transmission and reception is thus advantageously possible without mounting the supporting element afresh.

An advantageous development provides that the plug element and the supporting element are configured in a single piece, resulting in, in particular for manufacture using the injection-molding process, an advantageous reduction to a single manufacturing step. Similarly, the single-part design of the bottom of the device housing as a mating plug element is advantageous.

As a result of the design of the supporting element with continuous openings which can be positioned using screw holes for fastening screws of a flush mounting box, mounting on a flush mounting box is possible. This has the advantage that no bore holes are required in the wall in order to mount the supporting element. Furthermore, a consistently hollow design both of the plug element and of the mating plug element permits lines to be routed out of sight from the flush mounting box into the device.

The plug element is advantageously provided with guide elements which should prevent the mating plug element unintentionally rotating on the plug element. If these guide elements of the plug element are designed as slots in the tubular wall of the tubular plug element, it is possible to lead surface-mounted lines into the interior of the plug element and through this to the bottom of the housing, whereby surface-mounted lines are also routed cleanly.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 shows a schematic intersection view of a flush mounting box with a mounted supporting element and a wall housing which can be placed thereon.

DETAILED DESCRIPTION OF THE PREFERRED EMBODIMENT

Figure 1A:
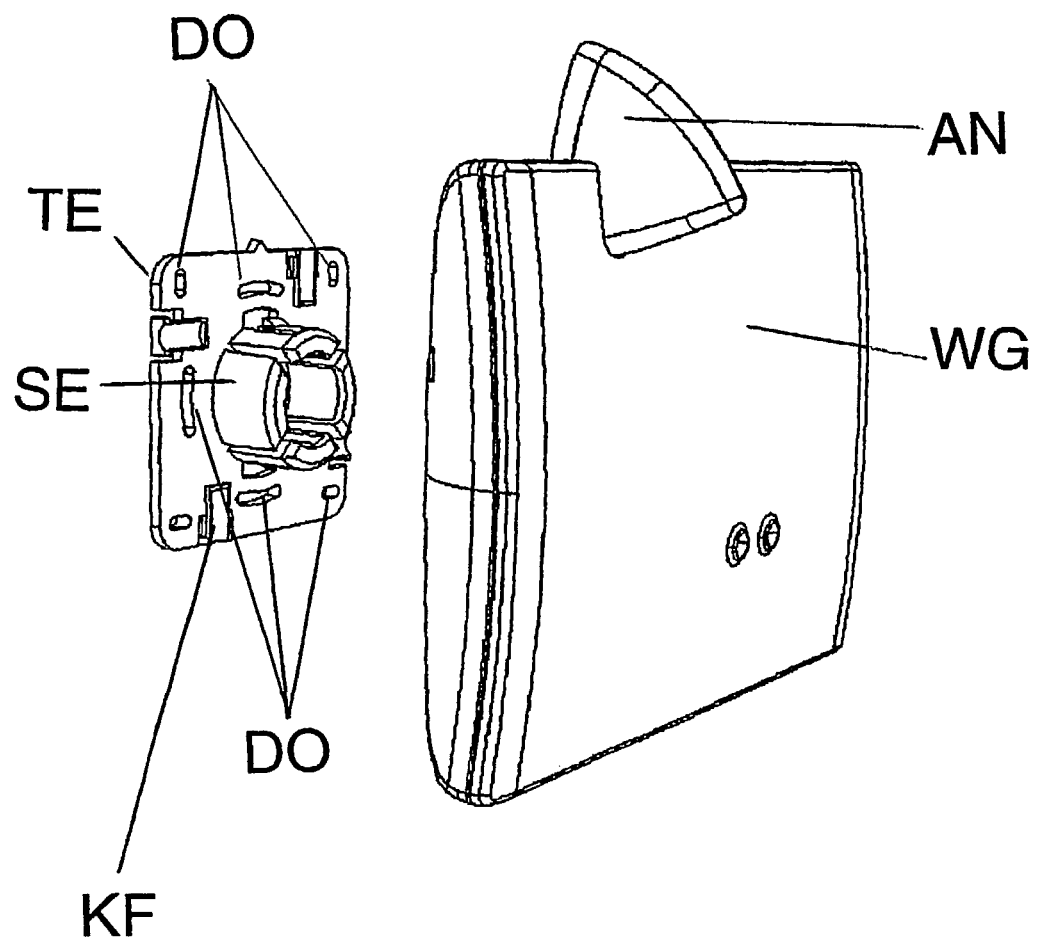
FIG. 1A shows a schematic front view of a supporting element and of a wall housing of a radio base station.

Reference will now be made in detail to the preferred embodiments of the present invention, examples of which are illustrated in the accompanying drawings, wherein like reference numerals refer to like elements throughout.

FIG. 1A shows a front view of the wall housing WG of a (DECT) base station and the latter's associated supporting element TE. The wall housing WG has a molded design to accept an antenna AN. The supporting element TE has a central plug element SE which has the form of a cylinder sleeve. Feed-through openings DO are present on the supporting element TE, the external ones thereof being used for conventional screw mounting on a wall, and the internal ones being designed as segment-shaped slots and being used for mounting the supporting element TE on a flush mounting box (not shown) using the fastening screws present there. The supporting element TE has a cable fastening KF which, by a cable tie allows surface-mounted lines to be fixed in position which are routed from the surface of the wall to connections in the wall housing WG.

Figure 1B:
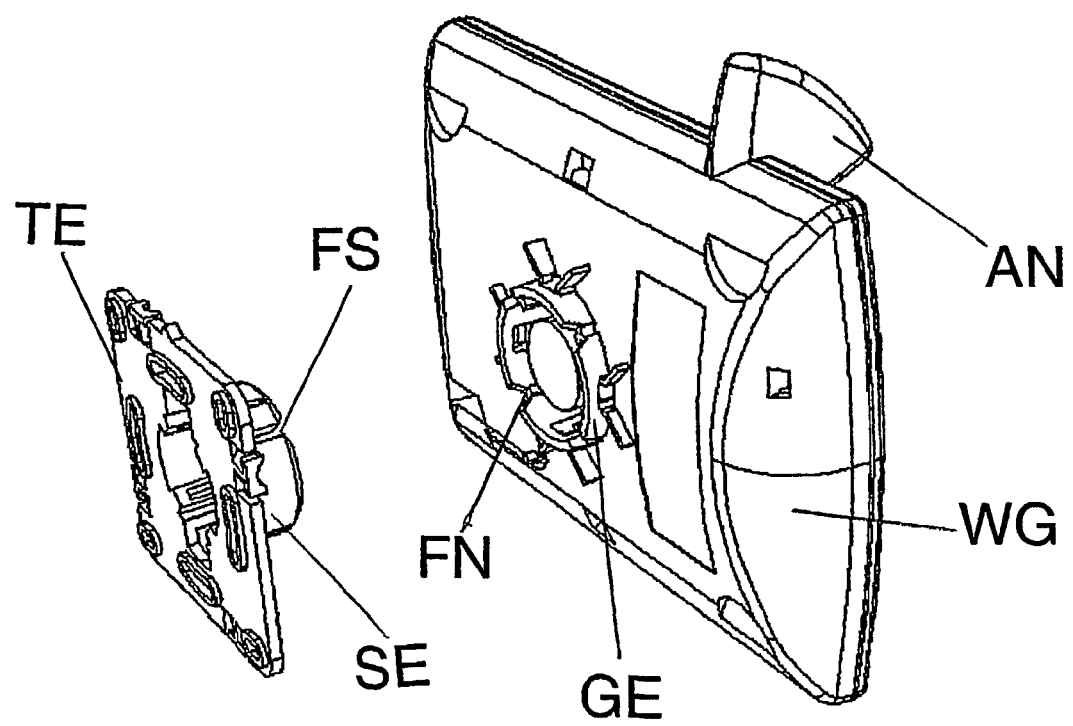
FIG. 1B shows a schematic rear view of a supporting element and of a wall housing of a radio base station.

FIG. 1B shows a rear view of the wall housing WG with the associated antenna AN and the supporting element TE. In this view the mating plug element GE can be identified as part of the wall housing WG, which, routed by four guide lugs FN in form-corresponding guide slots FS of the plug element SE, can be plugged into the central plug element SE. The circular cross-section of the plug element SE or the mating plug element GE, as well as four diametrically opposite guide lugs FN or guide slots FS arranged in pairs, their diametrical axes forming a right angle, allows the wall housing WG to be plugged in on the supporting element TE in four rotational angular positions in the plane of the wall in 90° steps.

FIG. 2 shows a section through a flush mounting box UP sunk into the wall W and through a supporting element TE fastened above it with screws. An intersectional view of the wall housing WG with its integrated mating plug element GE is also shown. A flush line ZU in the flush mounted box UP is routed though an axially extending hollow space in the plug element SE and in the mating plug element GE to the connections (not shown) in the wall housing WG.

A flush line ZU in the flush mounting box UP is routed through the axially extending hollow space in the plug element SE and in the mating plug element GE with the help of guide slots FS (not shown) to connections (not shown) in a depression (not shown) on the back of the wall housing WG. The surface-mounted lines ZA are then routed through the guide slots FS (not shown) into the axially extending hollow spaces in the plug element and in the mating plug element GE and are routed out again at the height of the connections (not shown).

A retaining point RS is formed by a retaining latch on the plug element SE and a retaining groove on the mating plug element GE. When the mating plug element GE is plugged into the plug element SE the mating plug element GE rests on the plug element SE on an end mounting point, the retaining point RS, which is provided, thereby preventing removal of the wall device WG. Through a mechanical effect on the retaining latch on the supporting element TE, e.g. by a screwdriver, this prevention from removal can be reversed and the wall device WG can be removed from the supporting element TE.

The invention has been described in detail with particular reference to preferred embodiments thereof and examples, but it will be understood that variations and modifications can be effected within the spirit and scope of the invention.

The invention claimed is:

1. A device having a housing with a bottom and a mating plug element joined to the bottom of the housing, comprising:
   a supporting element;
   a central tubular plug element, one of attached to and integral with said supporting element to plug in and retain the mating plug element, said central tubular plug element positively engaging, at least in partial areas, with the mating plug element extending at least one of over and into the central tubular plug element; and
   axially extending guide elements, arranged on said central tubular plug element, to maintain a selected rotational angle position between said central tubular plug element and the mating plug element,
   wherein said central tubular plug element includes a sleeve and the axially extending guide elements are slots extending axially along the sleeve of said central tubular plug element.

2. A device according to claim 1, wherein said central tubular plug element includes at least one retaining arrangement to prevent the mating plug element being removed from said central tubular plug element.

3. A device according to claim 2, wherein said supporting element and said central tubular plug element are one integral piece.

4. A device according to claim 3, wherein a partial area of the bottom of the housing is the mating plug element.

5. A device according to claim 4, wherein said device is mountable using fastening screws of a flush mounting box, and
   wherein said central tubular plug element has continuous openings for the fastening screws of the flush mounting box.

6. A device according to claim 5, wherein said central tubular plug element and the mating plug element are continuously hollow in an axial area provided for accepting a line.

7. A device according to claim 1, wherein surface cables can be routed through the slots.

8. A device according to claim 1, wherein the the slots are engageable with movable lugs of a mating plug.

9. A device according to claim 1, wherein a selected rotational angle position between said central tubular plug element and the mating plug element is maintainable by axially extending guide elements arranged on the mating plug element.

10. A device according to claim 9, wherein said central tubular plug element includes a sleeve and the axially extending guide elements are slots extending axially along the sleeve of said central tubular plug element and engaging the movable lugs arranged on the mating plug element.

11. A device having a housing with a bottom, a mating plug element joined to the bottom of the housing, and axially extending guide elements arranged on the mating plug element, said device comprising:
   a supporting element; and
   a central tubular plug element, one of attached to and integral with said supporting element to plug in and retain the mating plug element, said central tubular plug element positively engaging, at least in partial areas, with the mating plug element extending at least one of over and into the central tubular plug element, the axially extending guide elements arranged on the mating plug element maintaining a selected rotational angle position between said central tubular plug element and the mating plug element,
   wherein said central tubular plug element includes a sleeve and the axially extending guide elements are slots extending axially along the sleeve of said central tubular plug element.

* * * * *